United States Patent [19]

Vidal et al.

[11] 4,183,972

[45] Jan. 15, 1980

[54] POTASSIUM BROMATE COMPOSITION

[75] Inventors: Frederick D. Vidal, Bergen; Albert B. Gerrity, Monmouth, both of N.J.

[73] Assignee: Pennwalt Corporation, Philadelphia, Pa.

[21] Appl. No.: 893,555

[22] Filed: Apr. 5, 1978

[51] Int. Cl.² .............................................. A21D 10/00
[52] U.S. Cl. ..................................... 426/653; 426/622
[58] Field of Search ........................... 426/653, 20-23, 426/26, 61, 648, 622

[56] References Cited

U.S. PATENT DOCUMENTS

| | | | |
|---|---|---|---|
| 3,777,038 | 12/1973 | Thompson | 426/653 |
| 3,954,999 | 5/1976 | Vidal et al. | 426/653 |

*Primary Examiner*—Raymond N. Jones
*Assistant Examiner*—Elizabeth A. Hatcher

[57] ABSTRACT

For use in the milling and baking industry, potassium bromate is mixed with a sufficient amount of an inert, edibly acceptable phosphate salt and an inert edibly acceptable hydrated salt to provide a bromate composition having an acceptably reduced fire and explosion hazard when the bromate composition is diluted with starch or flour.

14 Claims, No Drawings

POTASSIUM BROMATE COMPOSITION

This invention relates to a fire and explosion safe potassium bromate formulation for use in the milling and baking industries. More specifically, it relates to a potassium bromate composition containing an inert edibly acceptable phosphate salt and an inert, edibly acceptable hydrated salt in amounts sufficient to reduce the tendency of the potassium bromate, as a dust or when diluted with flour or starch, to ignite when exposed to a flame or spark.

Although 100 percent potassium bromate or potassium bromate mixed with small amounts of anticaking additives, such as 5 percent magnesium carbonate, can be considered a stable and relatively inert product, the fire and explosion hazard increases tremendously as soon as the product is mixed with starch or flour. Fires and explosions have occurred in mills when concentrated potassium bromate was diluted for proper feeding purposes with flour or starch and a flame or spark came into contact with this mixture. In addition, potassium bromate dust is very susceptible to ignition and combustion and this susceptibility is aggrevated by the presence of flour or starch.

It is a principal object of this invention to provide a potassium bromate product for use in the milling and baking industries which has an acceptably reduced fire and explosion hazard.

Accordingly, this invention is a composition for improving flour and dough consisting essentially of a powdery mixture of potassium bromate with, for each 100 parts by weight of said bromate, from atleast a flame retardant amount, preferably about 30 parts, up to about 125 parts by weight of an inert, edibly acceptable phosphate salt, and an inert edibly acceptable hydrated salt which provides no more than about 50 parts of water per 100 by weight of bromate. Examples of these phosphate salts include $CaHPO_4$, $CaHPO_4.2H_2O$, $Ca(H_2PO_4)_2.H_2O$, $Ca_3(PO_4)_2$, $(NH_4)_3PO_4$, $NH_4H_2PO_4$, $(NH_4)_2HPO_4$, $Na_3PO_4$, $Na_3PO_4.12H_2O$, $Na_2HPO_4$, $Na_2HPO_4.12H_2O$, $Na_2HPO_4.7H_2O$, $NaH_2PO_4.H_2O$, $(NaPO_3)_3$, $(NaPO_3)_6$, $Na_4P_2O_7$, $KH_2PO_4$, $K_2HPO_4$, $K_3PO_4$ and the like. The useful phosphate salt may or may not be hydrated. The hydrated companion salt includes the edibly acceptable hydrated alkali metal and hydrated alkaline earth metal salts of organic or inorganic acids. Examples of these hydrated salts include the hydrated phosphate salts included above as well as $CaSO_4.2H_2O$; $MgSO_4.7H_2O$; KNa tartrate. $4H_2O$; sodium citrate. $2H_2O$; calcium citrate. $4H_2O$; $FeCl_3.6H_2O$; $CuSO_4.5H_2O$, $KAl(SO_4)_2.12H_2O$ and the like.

In U.S. Pat. No. 3,954,999 issued May 4, 1976, a dough improver composition is disclosed and claimed which includes a strong oxidizing agent such as potassium bromate, an organic flour and dough additive such as azodicarbonamide, and an inert hydrated salt. The inert hydrated salt is included in the composition to reduce fire and explosion hazard for the claimed composition.

To demonstrate the efficacy of the potassium bromate formulations of this invention, they were tested in a flame test and safety tests. The flame test was conducted by holding the flame of a Bunsen burner to the test sample for five seconds, then withdrawing the flame and observing and noting the results. A hazard evaluation rating system was employed wherein the numbers of 1 through 10 were used to designate the results. The best flame rating (most resistant to decomposition and ignition) was assigned the number 1 whereas the poorest rating (least resistant to decomposition and ignition) was assigned the number 10.

The safety tests consisted of the Modified Trauzl Block Test, the Impact Sensitivity Test and the Hot Plate Test. The Modified Trauzl Block Test measures the sensitivity of the test sample to a blasting cap shock and the potential energy released under these conditions. Quantitative measurement is made by measuring the degree of expansion of a lead block into which 6 grams of substance in a sample vial is placed in contact with a No. 8 electric blasting cap. The volume of the lead block is measured before and after detonation to the nearest half milliliter using water as a reference medium. The increase in the volume of the block is reported as the "Trauzl number". The minimum expansion is the result obtained using water as the test material, which gives as expansion of 7.0 ml., or a Trauzl number of 7. The maximum expansion which can be sustained by the lead block, before rupturing, is 115 ml. or a Trauzl number of 115. For the kind of compositions involved herein, Trauzl numbers of less than 30 are regarded as designating safe materials.

Another test for gauging safety of the composition is the "Impact Sensitivity" test in which the test apparatus, a DuPont Impact testing machine, is set at a desired height. A 30 milligram sample of the composition is placed in the center of the drop test cup. The cup is placed on the anvil, under the plunger pin assembly and the weight dropped. This operation is repeated at several different heights. A report and/or smoke and obvious decomposition of the sample is considered a positive result. If none of these properties is observed, the result is considered negative.

The Hot Plate Test is designed to evaluate the tendency of a sample of the composition to discolor or ignite when subjected to flameless heat. In this test a 5 g. sample is weighed into a $2\frac{1}{2}''$ diameter $\times \frac{5}{8}''$ deep aluminum dish and the dish is placed on the hot plate of a Fisher Heavy Duty Hot Plate (660 watts, 7 inch diameter steel top) which has been adjusted to maintain a 600° F. surface temperature. The behavior of the sample is observed for up to 10 minutes and the observation recorded.

Potassium bromate formulations tested herein were prepared by the following blending method:

All ingredients are sifted through a #80 mesh sieve before adding to blender. The potassium bromate is mixed with the phosphate and hydrated salt by blending in a P-K Twin Shell Blendor for 5–10 minutes. The balance of ingredients, if any, is added to the mixer blended for an additional 20 minutes.

Where potassium bromate is shown herein as potassium bromate (95%), the additional 5% of the composition consists of magnesium carbonate.

To ascertain the extent of the problem of the tendency of potassium bromate to ignite when blended with flour and the conditions under which this hazard develops, tests were conducted with the bromate alone and in specified mixtures. The test results showed little difference in hazard between a 95% potassium bromate (5% magnesium carbonate anticaking agent) a 90% potassium bromate and a 50% potassium bromate. The following table demonstrates this.

TABLE 1
SAFETY TESTS

| | | Impact Sensitivity (at 40 inches) | Trauzl Value (ml) | Hot Plate Test |
|---|---|---|---|---|
| (a) | 100% KBrO$_3$ (95%) | Negative | 17 | No ignition or discoloration |
| (b) | 50% KBrO$_3$ (95%) 48% CaSO$_4$ . 2H$_2$O 2% Ca$_3$(PO$_4$)$_2$ | Negative | 10.5 | No ignition or discoloration |
| (c) | 90% KBrO$_3$ (95%) 8% CaSO$_4$ . 2H$_2$O 2% Ca$_3$(PO$_4$)$_2$ | Negative | 15 | No ignition or discoloration |
| (d) | 55% (c) 45% flour | Negative | 37.5 | Instant flaming ignition, almost explosive burning |
| (e) | 53% (a) 47% flour | Negative | 55 | Ignition and browning |

The Trauzl number increases as well as the rapidity of ignition and burning, when the bromate mixture is diluted with flour.

The following table sets forth the ingredients and proportions used for the formulations of Examples 1 through 13.

TABLE 2

| Example Ingredient | 1 % | 2 % | 3 % | 4 % | 5 % | 6 % | 7 % | 8 % | 9 % | 10 % | 11 % | 12 % | 13 % |
|---|---|---|---|---|---|---|---|---|---|---|---|---|---|
| Potassium bromate (95%) | 50 | 50 | 50 | 50 | 50 | 50 | 50 | 50 | 50 | 50 | 50 | 50 | 50 |
| Dicalcium phosphate . 2H$_2$O | 50 | — | — | — | — | — | — | — | — | — | — | — | — |
| Diammonium phosphate | — | 50 | — | — | — | — | — | — | — | — | — | — | — |
| Monoammonium phosphate | — | — | 50 | — | — | — | — | — | — | — | — | — | — |
| Tricalcium phosphate | — | — | — | 50 | — | — | — | — | — | — | — | — | — |
| Dipotassium phosphate | — | — | — | — | 50 | — | — | — | — | — | — | — | — |
| Monopotassium phosphate | — | — | — | — | — | 50 | — | — | — | — | — | — | — |
| Tripotassium phosphate | — | — | — | — | — | — | 50 | — | — | — | — | — | — |
| Disodium phosphate . 7H$_2$O | — | — | — | — | — | — | — | 50 | — | — | — | — | — |
| Monosodium phosphate | — | — | — | — | — | — | — | — | 50 | — | — | — | — |
| Sodium pyrophosphate | — | — | — | — | — | — | — | — | — | 50 | — | — | — |
| Sodium hexametaphosphate | — | — | — | — | — | — | — | — | — | — | 50 | — | — |
| Trisodium phosphate . 12H$_2$O | — | — | — | — | — | — | — | — | — | — | — | 50 | — |
| Sodium Trimetaphosphate | — | — | — | — | — | — | — | — | — | — | — | — | 50 |

The formulations of Table 2 were each mixed with equal parts of flour (1 part potassium bromate formulation with 1 part patent flour) and each subjected to the Flame Test for screening purposes. The result of this testing is reported in the following table.

TABLE 3

| | Flame Test | |
|---|---|---|
| Example | Reaction to Flame | Test Rating |
| 1 | Good: slight charring | 2 |
| 2 | Similar to Example 1 | 2 |
| 3 | Fair to good: ignition-no propagation | 6 |
| 4 | Very good-less charring than Example 1 | 1 |
| 5 | Good: slight charring | 2 |
| 6 | Similar to Example 5 | 2 |
| 7 | Fair to good-some sparking-charring like Example 5 | 4 |
| 8 | Very good-less charring than Example 5 | 1 |
| 9 | Similar to Example 5 | 2 |
| 10 | Similar to Example 8 | 1 |
| 11 | Poor-ignition-propagation | 8 |
| 12 | Very good: slight charring | 1 |
| 13 | Poor:ignition-slight burning | 7 |

The formulations set forth in the following table were prepared employing the formulations which performed best in the screening Flame Test.

TABLE 4

| Example Ingredient | 14 % | 15 % | 16 % | 17 % | 18 % | 19 % | 20 % |
|---|---|---|---|---|---|---|---|
| Potassium bromate (95%) | 52.6 | 52.6 | 52.6 | 52.6 | — | — | — |
| Potassium bromate (100%) | — | — | — | — | 50.0 | 50.0 | 50.0 |
| Calcium sulfate . 2H$_2$O | 13.0 | 13.0 | 13.0 | 13.0 | 19.0 | — | 11.75 |
| Sodium pyrophosphate | 26.4 | — | — | — | — | — | — |
| Dicalcium phosphate . 2H$_2$O (milled) | — | — | 26.4 | 26.4 | 20.0 | — | 11.75 |
| Diammonium phosphate | — | 26.4 | — | — | — | — | — |
| Aluminum potassium sulfate . 12H$_2$O | — | — | — | — | 4.0 | 23.0 | 11.75 |
| Trisodium phosphate . 12H$_2$O | — | — | — | — | 4.0 | 24.0 | 11.75 |
| Tricalcium phosphate | 3.0 | 3.0 | 3.0 | 2.5 | 3.0 | 3.0 | 3.0 |
| Cabosil* | — | — | — | 0.5 | — | — | — |
| Magnesium carbonate | 5.0 | 5.0 | 5.0 | 5.0 | — | — | — |

*Tradename for silicon dioxide powder

The above formulations were each dry blended with an equal part of patent flour and subjected to the Flame Test, the results of which are reported in the following table.

TABLE 5

| Example | Reaction to Flame | Test Rating |
|---|---|---|
| 14 | Very good - slight decomposition - no ignition - no propagation nor smoke | 1 |
| 15 | Good - moderate decomposition - slight sparking and smoke - no propagation - black residue | 2 |
| 16 | Similar to Example 14 | 1 |
| 17 | Similar to Example 14 | 1 |
| 18 | Very mild decomposition no propagation - no smoke | 1 |
| 19 | Similar to Example 18 | 1 |
| 20 | Similar to Example 18 | 1 |

Safety tests were also conducted to establish conditions under which potassium bromate formulations are either hazardous or safe. The following table sets forth the formulations which were tested.

TABLE 6

| Example Ingredient | 21 % | 22 % | 23 % | 24 % |
|---|---|---|---|---|
| Potassium bromate (95%) | 52.6 | 52.6 | 52.6 | 52.6 |
| Dicalcium phosphate .2H$_2$O | 26.4 | — | — | — |
| Calcium sulfate . 2H$_2$O | 13.0 | — | 39.4 | — |
| Calcium sulfate (anhyd.) | — | — | — | 39.4 |
| Magnesium carbonate | 5.0 | — | 5.0 | 5.0 |
| Tricalcium phosphate | 2.5 | 2.5 | 2.5 | 2.5 |
| Cabosil* | 0.5 | 0.5 | 0.5 | 0.5 |
| Starch (corn) | — | 44.4 | — | — |

Safety Test data for the formulations of above Examples 21–23 are set forth in the following table.

TABLE 7

| Example | Impact Sensitivity | Trauzl Value | Hot Plate Test |
|---|---|---|---|
| 21 (50% Bromate content) | Neg. at 40 in. | 10.5 ml | No burning or discoloration after 600 sec. |
| 22 (50% brom Bromate content | Shock sensitive at 35 in. | 31.0 ml | Flaming decomposition after 117 sec. Burned 2 sec. 20 in. flame height |
| 23 (50% Bromate content | Neg. at 40 in. | 11.0 ml | No burning or discoloration after 600 sec. |

The formulations of Examples 21–24 of Table 6 were dry blended with flour to provide a 50—50 weight percent mixture and Safety Tests were performed on these blends. The Safety Test data is set forth in the following table.

TABLE 8

| Example | Impact Sensitivity | Trauzl Value | Hot Plate Test |
|---|---|---|---|
| 21 (25% Bromate content 50% flour) | Neg. at 40 in. | 14 ml | Smoking at 327 sec. Rapid decomposition at 440 sec. No ignition. |
| 22 (25% Bromate content 50% flour) | Neg. at 40 in. | 15.5 ml | Smoking at 277 sec. Flaming decomposition at 381 sec. Burned 9 sec. 12 in. flame height. |
| 23 (25% Bromate content 50% flour) | Shock sensitive at 40 in. | 12.5 ml | Smoking at 251 sec. Flaming decomposition after 390 sec. Burned 3 sec. 12 in. flame height. |
| 24 (25% Bromate content 50% flour) | Shock sensitive at 37 in. | 15.2 ml | Smoking at 245 sec. Flaming decomposition at 312 sec. Burned 4 sec. 12 in. flame height. |

The above results (Tables 7 and 8) demonstrate that the combination of a phosphate salt (CaHPO$_4$.2H$_2$O) and the hydrated salt (CaSO$_4$.2H$_2$O) inhibit the hazard potential of the bromate composition to a greater degree, with and without flour, than does the hydrate salt alone. The hydrated calcium sulfate (CaSO$_4$2H$_2$O) provides better protection against hazard than does the anhydrate of calcium sulfate (Table 8, Example 24) in the presence of flour. While the impact sensitivity results shown for Example 22 in Table 8 are unexplained and completely contrary to the overall findings, in general the hydrated salt is superior to starch as a carrier (Tables 7 and 8, Example 22).

Flame Test results for Examples 21–24 are reported in the following table.

TABLE 9

| Example | Reaction to Flame | Test Rating |
|---|---|---|
| 21 | Excellent - mild decomposition. no charring | 1 |
| 22 | Very poor - rapid complete decomposition - ignition - propagation - black residue | 8 |
| 23 | Very good - mild decomposition- slight smoke | 2 |
| 24 | Similar to Example 23 | 2 |

Flame Test results for the same formulations with equal portions of flour (50—50 weight percent blend) are set forth in the following table.

TABLE 10

| Example | Reaction to Flame | Test Rating |
|---|---|---|
| 21 | Very good - moderate decomposition- Slight black residue | 1 |
| 22 | Poor - fairly rapid decomposition- ignition- no propagation - black residue | 6 |
| 23 | Good - similar to Example 21 in this table but not quite as good | 2 |
| 24 | Similar to Example 23 in this table | 2 |

Other similar potassium bromate formulations were prepared and submitted to Safety and Flame Tests. The compositions of these formulations are set forth in the following table.

TABLE 11

| Example<br>Ingredient | 25<br>% | 26<br>% | 27<br>% | 28<br>% |
|---|---|---|---|---|
| Potassium bromate (95%) | 52.6 | 52.6 | 52.6 | 52.6 |
| Dicalcium phosphate (anhyd.) | 39.4 | — | — | — |
| Calcium sulfate . 2H$_2$O | — | 39.4 | — | 39.4 |
| Sodium pyrophosphate . 10H$_2$O | — | — | 39.4 | — |
| Magnesium carbonate | 5.0 | 5.0 | 5.0 | 5.0 |
| Tricalcium phosphate | 3.0 | 3.0 | 3.0 | 3.0 |

Results of Flame Tests on Example 25–27 are reported in the following table.

TABLE 12

| Example | Reaction to Flame | Test Rating |
|---|---|---|
| 25 | Excellent - mild decomposition- no charring | 1 |
| 26 | Very good - mild decomposition- slight smoke | 2 |
| 27 | Very good - moderate decomposition | 2.5 |

The formulations of Examples 25–27 were blended with equal portions of flour (50—50 weight percent mixture) and exposed to the Flame Test. The results are set forth in the following table.

TABLE 13

| Example | Reaction to Flame | Test Rating |
|---|---|---|
| 25 | Very good - moderate decomposition - slight black residue | 1 |
| 26 | Good - moderate decomposition - slight black residue | 2 |
| 27 | Good - slightly more vigorous decomposition than Example 26 | 3 |

Safety Test results for Examples 25–27 are reported in the following table.

TABLE 14

| Ex. | Impact Sensitivity | Trauzl Value | Hot Plate Test |
|---|---|---|---|
| 25 | Neg. at 40 in. | 8.5 | No burning or discoloration after 600 sec. |
| 26 | Neg. at 40 in. | 9.8 | No burning or discoloration after 600 sec. |
| 27 | Neg. at 40 in. | 8.3 | No burning or discoloration after 600 sec. |

Safety Test results for Examples 25–28 where such formulations were blended with equal portions of flour (50—50 weight percent mixture) are reported in the following table.

TABLE 15

| Example | Impact Sensitivity | Trauzl Value | Hot Plate Test |
|---|---|---|---|
| 25 | Neg. at 40 in. | 13.4 | Smoking at 217 sec. Flaming decomposition affter 302 sec. Burned 2 sec. 12 in. flame |
| 26* | Positive at 40 in. | 11.8 | Smoking at 236 sec. Flaming decomposition after 325 sec. Burned 6 sec. 12 in. flame |
| 27 | Neg. at 40 in. | 10.0 | Burned 7 sec. 12 in flame |

Average of 2 safety tests performed on Example 26 formulation with flour and Example 28 formulation with flour (50–50 mixture).

The foregoing data relating to Flame Test and Safety Test results demonstrate the unexpected reduction in hazard potential for the potassium bromate compositions of this invention. In addition, the compositions of this invention were used extensively in Sponge and Pup Bake tests and provided superior grain quality and improvement in loaf volume-weight ratio for bread baked in these tests.

We claim:

1. A composition for improving flour and dough consisting of a powdery mixture of potassium bromate with, for each 100 parts of by weight of said bromate, from about 30 up to about 125 parts of an inert, edibly acceptable, flame retardant phosphate salt and additionally an inert, edibly acceptable hydrate salt which provides no more than about 50 parts by weight of water per 100 parts by weight of said bromate, said hydrate salt being present in an amount at least sufficient to reduce the fire and/or explosion hazard of the composition when mixed with equal proportions of flour or starch.

2. The composition of claim 1 wherein the phosphate salt is also a hydrated salt which provides a total of no more than about 50 parts by weight of water in the composition per 100 parts by weight of said bromate.

3. The composition of claim 1 wherein said phosphate salt is selected from the group consisting of CaHPO$_4$.2H$_2$O; CaHPO$_4$; Na$_4$P$_2$O$_7$; Na$_2$HPO$_4$.7H$_2$O; Na$_3$PO$_4$.12H$_2$O; Na-hexametaphosphate; K$_2$HPO$_4$; Ca(H$_2$PO$_4$)$_2$; NH$_4$H$_2$PO$_4$; and Na$_3$PO$_4$.

4. The composition of claim 1 wherein said hydrated salt is selected from the group consisting of CaSO$_4$.2H$_2$O; MgSO$_4$.7H$_2$O; Na$_2$SO$_4$.10H$_2$O; Na$_2$CO$_3$.10H$_2$O; KAl(SO$_4$)$_2$.12H$_2$O; and calcium lactate .5H$_2$O.

5. The composition of claim 3 wherein the hydrated salt is selected from the group consisting of CaSO$_4$.2H$_2$O; MgSO$_4$.7H$_2$O; Na$_2$SO$_4$.10H$_2$O; Na$_2$CO$_3$.10H$_2$O; KAl(SO$_4$)$_2$.12H$_2$O; and calcium lactate .5H$_2$O.

6. The composition of claim 1 wherein the phosphate salt is CaHPO$_4$ and the hydrated salt is CaSO$_4$.2H$_2$O.

7. The composition of claim 2 wherein the phosphate salt is CaHPO$_4$.2H$_2$O and the hydrated salt is CaSO$_4$.2H$_2$O.

8. The composition of claim 5, 6 or 7 which additionally contains from about 1 to about 10 parts by weight of an anticaking additive for each 100 parts of bromate.

9. In the method of preparing a dry flour or starch diluted potassium bromate mixture for use in the milling and baking industries wherein said flour or starch is blended with a potassium bromate composition the improvement which comprises employing as said bromate composition a composition consisting of potassium bromate, from about 30 to about 125 parts by weight of an edibly acceptable phosphate salt for each 100 parts of said bromate and an edibly acceptable hydrate salt in an amount sufficient to reduce the fire and/or explosion hazard of said mixture but which provides no more than about 50 parts by weight of water per 100 parts of said bromate.

10. The method of claim 9 wherein said phosphate salt is selected from the group consisting of CaHPO$_4$.2-

$H_2O$; $CaHPO_4$; $Na_4P_2O_7$; $Na_2HPO_4.7H_2O$; $Na_3PO_4.12H_2O$; Na-hexametaphosphate; $K_2HPO_4$; $Ca(H_2PO_4)_2$; $NH_4H_2PO_4$; and $Na_3PO_4$.

11. The method of claim 9 or 10 wherein said hydrated salt is selected from the group consisting of $CaSO_4.2H_2O$; $MgSO_4.7H_2O$; $Na_2SO_4.10H_2O$; $Na_2CO_3.10H_2O$; $KAl(SO_4)_2.12H_2O$; and calcium lactate $.5H_2O$.

12. The method of claim 9 wherein said phosphate salt is $CaHPO_4$ and said hydrated salt is $CaSO_4.2H_2O$.

13. The method of claim 9 wherein said phosphate salt is $CaHPO_4.2H_2O$ and said hydrated salt is $CaSO_4.2H_2O$.

14. The method of claim 12 or 13 wherein said composition additionally containing from about 1 to about 10 parts by weight of anticaking additive for each 100 parts of bromate.

* * * * *